US Patent

May 24, 1988

Patent Number: 4,746,369

Sullivan et al.

[54] PEROXIDE SELECTIVE STRIPPING COMPOSITIONS AND METHOD

[75] Inventors: Thomas E. Sullivan, Hamden; Thomas W. Bleeks, New Haven, both of Conn.

[73] Assignee: Enthone, Incorporated, West Haven, Conn.

[21] Appl. No.: 18,224

[22] Filed: Feb. 24, 1987

Related U.S. Application Data

[60] Continuation of Ser. No. 776,560, Sep. 16, 1985, abandoned, which is a division of Ser. No. 717,608, Apr. 1, 1985, Pat. No. 4,608,091, which is a continuation of Ser. No. 338,805, Jan. 11, 1982, abandoned.

[51] Int. Cl.$^4$ .......................... C23G 1/02; C23G 1/02; C23G 1/00; C11D 7/18
[52] U.S. Cl. .......................... 134/3; 134/41; 156/664; 252/99; 252/100
[58] Field of Search ............... 134/3, 41; 156/664; 252/99, 100

[56] References Cited

U.S. PATENT DOCUMENTS

| | | | |
|---|---|---|---|
| 2,876,144 | 3/1959 | Bomberger et al. | 134/3 |
| 3,367,874 | 2/1968 | Haviland et al. | 252/101 |
| 3,738,867 | 6/1973 | Franz | 134/3 X |
| 3,856,694 | 12/1974 | Becking | 134/3 X |
| 3,903,244 | 9/1975 | Winkley | 423/272 |
| 3,905,907 | 9/1975 | Shiga | 134/3 X |
| 3,945,865 | 3/1976 | Kemperman | 156/666 |
| 3,953,263 | 4/1976 | Ishikawa et al. | 134/3 X |
| 3,996,062 | 12/1976 | Frost et al. | 134/3 X |
| 4,238,244 | 12/1980 | Banks | 134/22.18 |
| 4,244,833 | 1/1981 | Tomaszewski | 156/664 X |
| 4,302,246 | 11/1981 | Brindisi et al. | 134/3 X |
| 4,554,049 | 11/1985 | Batenbeck | 156/664 X |

*Primary Examiner*—Helen M. S. Sneed
*Assistant Examiner*—William G. Wright
*Attorney, Agent, or Firm*—John J. Tomaszewski; Kenneth A. Koch

[57] ABSTRACT

Acidic stripping solutions comprising hydrogen peroxide as oxidant, either at least one phosphorous-oxy acid, or the addition of nitric acid, together with accelerators and surface active agents, are effective for the rapid and selective removal of protective hard surface coatings and nickel-base brazes from a variety of metal surfaces.

2 Claims, No Drawings

PEROXIDE SELECTIVE STRIPPING COMPOSITIONS AND METHOD

This is a continuation of co-pending application Ser. No. 776,560 filed on Sept. 16, 1985, now abandoned, which application is a divisional of Ser. No. 717,608, filed on Apr. 1, 1985, now U.S. Pat. No. 4,608,091, which application is a continuation of Ser. No. 338,805, filed Jan. 11, 1982, now abandoned.

BACKGROUND OF THE INVENTION

This invention is related to the stripping of nickel-base brazes and "hard surface" coatings from a variety of metal substrates, and, more particularly, to a novel stripping composition and accompanying method for the selective removal of nickel-base brazes and hard surface coatings, applied by plasma spray, detonation gun, sputtering and vapor deposition techniques, to a variety of metal surfaces, without damaging the underlying substrate.

DESCRIPTION OF THE PRIOR ART

Selective metal stripping is one of the most common steps in many industrial manufacturing processes. Usually, the stripping is part of either a general overhaul, involving the refurbishing of a particular coating, or the reclaiming of a defectively plated part. The overhauling process becomes economically feasible when the particular product to be stripped is particularly valuable, such as in the case of high performance aircraft engine components. Also, defective plating will usually occur in a certain percentage of plated parts, resulting from imperfections in the basis metal, improper cleaning, excessive porosity of the substrate which leads to bleeding out of various cleaning and plating solutions, impurities, and human error. The particular method of stripping will usually depend upon the metal (or metals) to be stripped, the substrate material of the basic part, waste disposal requirements, and profitability.

The prior art has employed a variety of both chemical and mechanical methods in an effort to selectively remove protective coatings from the underlying metal substrate, such as the coatings and brazes that are frequently used in the aircraft industry, and particularly in high performance jet engines. Such methods, however, have proven unsatisfactory for a variety of reasons. Low metal stripping rates, general ineffectiveness at low operating temperatures, the handling and disposal of toxic cyanide containing solutions, and the environmental disposal of the spent fluids are problems arising from known chemical methods. Damage to precision machined parts such as jet engine stator assemblies, particularly the large dimensional changes which can result on the metal substrate, as well as pit formation in the base metal caused by pinholes in the hard coating are frequent results of using pressure blasting abrasive tool methods, and electrolytic stripping.

Hydrogen peroxide, $H_2O_2$, has been used as an oxidizing agent, in both acid and alkaline solutions, for the selective stripping and etching of metals; however, $H_2O_2$ has not been effectively adapted for stripping nickel-base metals and "hard surface" coatings, i.e., surfaces which are comprised of intermetallic or cermet compositions, and are applied to the surface to be protected by several high temperature flame deposition techniques, from metal substrates.

Nitric acid, $HNO_3$, is a well known stripping agent; however, since it is extremely corrosive it has found infrequent use when selectively stripping, since gentle treatment of the underlying substrate is necessary.

Phosphorous-oxy acids, used herein to signify phosphorous and oxygen containing substances which have a tendency to release a proton in aqueous solution, have found limited usage in the prior art; see, for example, U.S. Pat. Nos. 3,607,398 and 4,128,463; however, they have not been used in combination with peroxide agents nor for selective stripping required during the removal of nickel brazes and hard surface coatings. Selenium compounds and halogen containing accelerators have been used for the stripping of nickel from stainless steel in $HNO_3$ solutions; however, such solutions also oxidize and corrode the steel substrate.

OBJECTS OF THE INVENTION

Accordingly, it is an object of this invention to formulate an effective composition and accompanying method for the selective stripping of nickel-base brazes and protective hard surface coatings from metal substrates.

It is another object of this invention to formulate a stripping solution which has a much more rapid coating removal rate at lower operating temperatures than those of the prior art.

It is still another object of this invention to formulate a stripping solution for surface coatings which is non-corrosive to the metal substrate.

It is another object of this invention to strip flame sprayed cemented metal carbides, nickel aluminides, nickel graphite and molybdenum from metal substrates used in aircraft engines.

SUMMARY OF THE INVENTION

These and other objects of the invention have been accomplished through the discovery of an aqueous composition useful for the selective stripping of protective hard surface coatings and nickel-base brazes from metals, and particularly high strength alloy substrates, comprising about 75–250 grams/liter (g/l) of a peroxide agent, i.e., usually hydrogen peroxide, about either 50–200 g/l of nitric acid, or in the alternative, about 0–200 g/l of a mixture containing at least one phosphorous-oxy acid, with at least one such acid selected from the group consisting of phosphoric acid, Nitrilotris (methylene phosphonic acid) (NTPA); and hydroxyethane-1,1-diphosphonic acid (HEDPA). Both the nitric and phosphorous-oxy acid peroxide solutions preferably include about 0–40 g/l of an accelerating agent selected from the group consisting of chlorine and bromine containing ions and oxyanions, oxy compounds of Group VI elements such as selenium, and various mixtures thereof; about 0–5 g/l of an inhibiting agent selected from the group consisting of amines, polyamines, amine oxides and mixtures thereof, and about 0–5 g/l of a surfactant, such as a fluorocarbon; the acidity of the stripping solution having a pH value ranging from about −1 to about +0.5. The invention further includes a method for the selective stripping of hard surface coatings and nickel-base brazes from metal substrates, comprising contacting the surface deposit with an aqueous solution of the composition disclosed above, and immersing the surface deposit in the solution until the deposit is substantially removed from the metal substrate without damaging the substrate, keeping the solution temperature during operation between 20°–55° C., and preferably, about 35°–40° C.

DESCRIPTION OF THE INVENTION

A troublesome problem for the metal stripping art has been to formulate a composition which can selectively strip even the most difficult to remove coatings from metal substrates without damaging the underlying surface to be stripped. The need for such a stripping composition is particularly acute in the aircraft industry, where it is frequently necessary to disassemble and overhaul high performance aircraft engines which contain many expensive, reusable parts, particularly the gas turbine jet engines used, for example, in jet aircraft. The continual development of different protective coatings enabling higher temperature operation has necessitated new approaches to selective stripping. During such an overhaul, there exists a need for a composition which can chemically refurbish these worn or damaged parts, and the removal of brazes and hard surface coatings is an essential step in this process. The stripping agents used for such an overhaul must be very selective, i.e., they must attack only the braze or hard surface coating, while not attacking the underlying expensive metal substrate. Although applicants do not wish to be bound by theory, many of the coatings and brazes currently in use contain quantities of nickel and/or cobalt, and it is believed the dissolution of these metals promotes the loss of structural integrity of the coating or braze. The stripping must also take place at a practical, commercially viable rate, as opposed to just being a laboratory curiosity. The problem is particularly acute when one realizes that based on their chemical composition alone, these coatings may normally be considered more resistant to a chemical attack than the metal substrates they protect, and, in fact, their purpose is to impart high temperature corrosion protection and wear resistance to these metal substrates.

Surprisingly, it has been found that peroxide solutions in combination with either nitric acid, or, in the alternative, a class of mildly aggressive phosphorous-oxy acids, will remove such nickel-base brazes and hard surface coatings, and yet be inhibited from attacking the expensive machined metal substrates. When nitric acid is the acid system of choice, which occurs when high stripping rates are desired, $HNO_3$ in amounts ranging from about 50–200 grams/liter (g/l), and most preferably, about 75–150 g/l, in combination with a peroxide agent, most preferably $H_2O_2$, in amounts of about 75–250 g/l, and preferably incorporating an effective amount of accelerators, inhibitors, and surfactants, gives excellent results. Brazes which can be stripped from metal substrates by such an $HNO_3$—$H_2O_2$ based system include AMS 4779 (94% Ni, 3.5% Si, 1.8%B) from high alloy steel, AMS 4778 (Ni 92, Si 4.5, B 2.9 C 0.06) from AMS 1422, AMS 1424 and AMS 1455 nickel-base alloys, AMS 4777 (Ni 82, Si 4.5 Cr 7.0, B 3.1, Fe 3.0) from 410 Martensitic Stainless Steel (AMS 5504), and Nicrobraze LM (Ni 82.5, Cr 7.0, Si 4.5, B 3.0, Fe 3.0) from Stellite 31 (Co 57, Cr 26, Ni 10, W 7, Carbon 0.5). Hard surface coatings which have been stripped include Metco's 71NS and 71VF alloys (Co 12, C 4, Fe 1, W bal) from 347 and 410 stainless steels, Metco 307 (Ni 75, C 25) from Inconel 600 alloy, and Metco 450 (Al 4.5, Ni Bal) from 4130 steel, Hastelloy X and Inconel 600 substrates.

Surprisingly, it has also been found that peroxide solutions in combination with certain weakly agressive phosphorous-oxy acids will attack nickel-base brazes and hard surface coatings, and yet be inhibited from attacking the metal substrate. Phosphorous-oxy acids which have been particularly effective are phosphoric acid, nitrilo tris (methylene phosphoric acid) (NTPA), and hydroxyethane-1,1-diphosphonic acid (HEDPA), although most phosphonic acids, as well as many mixtures thereof, are believed to be particularly adaptable to the stripping composition of the invention. The precise amount of the phosphorous-oxy acid depends upon the character of the substrate to be stripped, as well as the coating composition. For example, phosphonic acids NTPA or HEDPA, when mixed with phosphonic acid can range from about 0–200 g/l when stripping from a stainless steel type substrate, and preferably about 100 g/l, while the same acids, when stripping from either titanium base or steel based substrate should be present from about 0–100 g/l and preferably, in about 75 g/l. In the same solution phosphonic and phosphoric acids can ran from about 0–200 g/l, and preferably, about 100 g/l.

The greatly preferred peroxide agent of choice is hydrogen peroxide, $H_2O_2$, both from the perspective of performance, cost, availability, and environmental effect. But, other peroxide agents, e.g., perborates, peroxydiphosphates, peroxysulfates and the like, can also be used in place thereof.

In order to maximize stripping effectiveness on steel surfaces, the peroxide and acid concentrations should be balanced. The preferred formulation approach is to combine a major amount of a weakly agressive phosphorous-oxy acid towards steel and/or titanium with a lesser amount of a more aggressive acid. The order of decreasing acid aggressiveness towards attacking carbon steel in peroxide solution of some commonly available acids of particular interest is as follows:

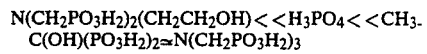

$$N(CH_2PO_3H_2)_2(CH_2CH_2OH) << H_3PO_4 << CH_3-C(OH)(PO_3H_2)_2 \simeq N(CH_2PO_3H_2)_3$$

If the peroxide oxidant concentration becomes exhausted, white or tan salt encrustations begin to form on the attached steel surface, indicating that the steel or titanium has corroded. Hard surface coatings which have been successfully stripped from metal substrates using phosphorous-oxy acid-peroxide-based systems without damaging the substrate can be seen from the following Table:

TABLE I

| | HARD SURFACE COATINGS | | | | | | | | | |
|---|---|---|---|---|---|---|---|---|---|---|
| | METCO | | | | UNION CARBIDE | | | | | |
| Supplier's Trade Name | 63 63 NS | 71 NS 71 VF 71 VF-NS | 307 | 450 | LM-6A | LW-11B | LW-IN30 | LW-IN40 | WT-1 WT-2 | |
| Coating Composition | Mo | Co 12 C 4 Fe 1 | Ni 75 C 25 | Al 4.5 Ni bal | Mo | Wc 88 Co 12 | Wc 87 Co 13 | Wc 85 Co 15 | WC Ti C Ni 17 | } 83 |

TABLE I-continued

HARD SURFACE COATINGS

W bal

| Application Method | ← Plasma Flame Spray → | | | | ← Detonation Gun → | | | |
|---|---|---|---|---|---|---|---|---|
| Metal Substrate(s) | Stainless Steel | 347 S. Steel 410 S. Steel | Inconel 600 | 4130 Steel Hast-X Inconel 600 | Stainless Steel | Titanium 64 alloy | 329 S. Steel | Titanium 64 alloy | Steel; Stellite 6 on steel |

Amounts ranging from 0–5 g/l of inhibiting agents can significantly aid in preventing chemical attack on the metal substrate particularly in the case of steel and titanium substrates. In particular, those inhibitors selected from the group of alkyl bis (2-hydroxy ethyl)-amines:

diamines      R—N(CH₂CH₂OH)₂,

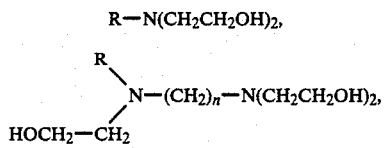

amine oxides:

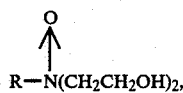

where R, represents an alkyl group, and mixtures of each, including different R's for each constituent such as the mixture of aliphatic amines sold under the trade name "Armohib 31", have been found to be effective. However, alky-polyethoxylated amines are ineffective, while mono, di and tri (2-hydroxyethyl) amines have been only marginally effective toward low carbon steels, thus leading to the conclusion that an alkyl group, as well as the 2-hydroxyethyl moiety, is required. It is suspected that the pendant $NH_2$ groups may provide greater inhibiting qualities than the isoelectronic OH unit. A nonexclusive list of inhibitors includes bis (2-hydroxyethyl) oleyl amine, bis (2-hydroxyethyl) octadecyl amine, bis (2-hydroxyethyl) cocoa amine oxide, bis (2-hydroxyethyl) tallow amine oxide, N,N',N'-tris (2-hydroxyethyl)-N-tallow-1,3-diaminepropane, and imino-bis-propylamine. Although applicants do not wish to be bound by theory, it is believed that a stereochemical characteristic exhibited by these structurally similar compounds is involved in preventing oxidant attack on the substrate. The preferred inhibitor, which is commercially available, sold under the name "Armohib 31" by Armak Chemicals of Chicago, Ill., is an aliphatic amine blend having a proprietary composition.

The addition of Group VI elements, particularly selenium and tellurium containing compounds, and most preferably those selenium compounds such as selenium dioxide, selenous or selenic acids, their metal salts, and mixtures, act to accelerate the removal of the coated deposit. The amounts added should range from about 0–40 g/l, preferably towards the lower end of the range. Halogen containing compounds, particularly such chlorine and bromine ions and oxyanions, such as $Cl^-$, $OCl^-$, $ClO_3$, $BrO_3^-$, $I^-$, $I_2$, $IO^-_3$, $IO^-_4$ and $IO_6^{5-}$, as well as their reaction products with peroxide should be effective accelerating agents, particularly when used in conjunction with selenium based accelerating agents. The preferred agents are selenium dioxide and certain chlorine containing species. Fluorine based ions, however, are not usually as effective as chlorine.

It is further preferred, although not essential, to add small amounts of a surfactant, such as 0–150 mg/l of "DB-31", a silicone based anti-foaming agent sold by Dow Corning Inc., when "Zonyl FSN", a fluorocarbon surfactant marketed by DuPont, or, instead, an amine based compound of the type that are well known in the art is included. These surfactants are desirable because they are resistant to oxidation by the stripping solution, thereby prolonging their life in the bath.

One significant advantage of the stripping composition is that effective stripping can be undertaken at significantly lower operating temperatures than currently required by conventional stripping agents. Stripping can be carried out between 20°–55° C., and preferably, about 35°–40° C., whereas the prior art alkaline solutions operated at a bath temperature of about 60° C. The acidity of the stripping bath is an important parameter for effective stripping; the pH of the acidic stripping solution must remain below about +1, and preferably, below 0, for most effective operation. Thus, most carboxylic acids cannot be used as the acid system since they are not sufficiently acidic, as only strong or moderately strong acids may be employed.

EXAMPLE I

The following composition:

| | g/l |
|---|---|
| Nitrilo tris(methylene phosphonic acid) (NTPA) | 82 |
| Phosphoric Acid | 62 |
| Hydrogen Peroxide | 120 |
| Armohib 31 (Inhibitor) | 2.1 |
| DB-31 (non ionic silicone defoamer) | 75 mg/l |
| Water | balance | was warmed to between 22°–57° C. (aver. 35° C.) in order to strip a titanium coupon (AMS 4911) of 7 cm×4 cm dimension, having a plasma spray coating of 0.3 mm Metco VF-NS, (87WC, 12CO, 1Fe) on one side. The coupon was immersed in the bath for 5 hours, at which time the coating had been stripped from the titanium surface. The coupon was subjected to a load of 300 lb/in² in order to determine whether embrittlement had taken place. No crack formation was observed.

EXAMPLE II

Three titanium shafts coated with a 7–7½ mil coating of LW-11B (WC 88, Co 12) were immersed in the solution of Example I, kept at a bath temperature of 38°–43° C., without any solution agitation, and after three hours the coating had been completely removed without damage to the underlying substrate.

EXAMPLE III

The following solution:

|  | g/l |
| --- | --- |
| Nitrilo tris(methylene phosphonic acid) (NTPA) | 82 |
| Phosphoric Acid | 30 |
| Hydrogen Peroxide | 120 |
| Selenium Dioxide | 1 |
| Armohib 31 | 1 |
| Water | balance | was mixed, and a 2 mil coating of LW-11B (WC 88, Co 12) on a titanium tube was immersed into the solution. The bath was maintained at 25°–35° C., while the tube was frequently agitated during the stripping process. After 1–1½ hours the coating had been stripped, whereupon the machined areas of the part was observed to have retained their original surface finish throughout the entire process.

EXAMPLES IV–V

The following solution:

|  | g/l |
| --- | --- |
| NTPA | 82 |
| Hydroxyethane-1,1-diphosphonic acid (HEDPA) | 62 |
| Hydrogen Peroxide | 120 |
| Armohib 31 (Inhibitor) | 2.3 |
| DB-31 | 75 mg/l |
| Water | balance | was used to strip WC-Co coatings from both a high alloy steel and a Ti-64 substrate. Both metal coupons were separately immersed in the stripper bath for about five hours, after which time both specimens were removed from the solution. The WC-Co coating had been substantially stripped without damage to either of the underlying substrates.

EXAMPLE VI

The following solution:

|  | g/l |
| --- | --- |
| Nitric Acid | 150 |
| Hydrogen Peroxide | 150 |
| Selenium Dioxide | 0.6 |
| Zonyl FSN | 0.29 |
| Water | balance | was mixed, after which a second stage nozzle guide vane, fabricated from Mar-M-200 (1Cb, 9Cr, 10Co, 2Ti, 5Al, 0.14C, 12-5W, 2Hf, bal Ni)+HF (PWA 1422 Directionally Solidified), and having two covers brazed with AMS 4778 (Ni 92, Si 4.5, B 2.9, C 0.06), was immersed for five hours in the solution, which was kept at an average temperature of 40° C. Upon removal from solution, the braze had been completely stripped so the covers could be removed from the vane by gentle prying. No substrate metal attack occurred, but the pack aluminide coating had been partially removed.

EXAMPLE VII

The solution of Example VI was again mixed and used to strip a jet engine part comprising a honeycomb lattice brazed to a high alloy steel with AMS 4779A in a bath kept at an average temperature of 43° C. After 1½ hours the honeycomb structure separated cleanly from the steel backing.

EXAMPLE VIII

The following solution:

|  | Volume % |
| --- | --- |
| Nitric Acid (70 wt %) | 20 |
| Hydrogen Peroxide (50 wt %) | 20 |
| Water | balance | was mixed, and an Inconel 600 coupon coated with 25 mils of Metco 307 nickel-graphite was immersed in solution and stripped within ¾ hour at an average bath temperature of 43° C.

EXAMPLE IX

The solution of Example VIII was mixed and an Inconel 600 coupon coated with a 25 mil layer of Metco 450 nickel aluminide was next immersed into the solution, which was kept between 45°–50° C. Complete coating removal required 80 minutes.

EXAMPLE X

The solution of Example VIII was mixed, and a 347 stainless steel shaft coated with a protective covering of 5½ mils of Metco 71 VF (Co 12, Fe 1, WC bal.) was then immersed and stripped in the solution maintained at a temperature between 40°–50° C. After a quarter hour the coating had been completely removed.

EXAMPLE XI

The following solution:

|  | g/l |
| --- | --- |
| Nitric Acid | 75 |
| Hydrogen Peroxide | 150 |
| Selenium Dioxide | 1 |
| Zonyl FSN | 0.5 |
| Water | balance | was warmed to between 30°–38° C., whereupon an Inconel X-750 stator segment which had been stripped of its nickel electroplate was immersed in the solution, which was given intermittant agitation during stripping. After 22 hours the AMS 4777 braze had been stripped (1.22 grams), whereupon the outer shroud and foot could be separated from the vane.

EXAMPLE XII

The following solution:

|  |  |
| --- | --- |
| Nitric acid | 150 g/l |
| Hydrogen Peroxide | 120 g/l |
| Selenium Dioxide | 5 g/l |
| Zinc Chloride (50 wt %) | 8 ml/l |
| Water | balance | was warmed to 47° C. (over), whereupon a 410 stainless steel "T" section brazed with PWA 996 was immersed for three hours, the solution being subjected to mild mechanical agitation during this time. Upon removal, the braze was sufficiently dissolved to permit separation of the joined parts. The cut edges of the 410 steel remained shiny and unetched.

EXAMPLE XIII

The following solution:

| | |
|---|---|
| Nitric acid (50 wt %) | 20 vol % |
| Hydrogen Peroxide (50 wt %) | 25 vol % |
| Aluminum Chloride (AlCl$_3$—6H$_2$O) | 23 g/l |
| Zonyl FSN | 0.1 vol % |
| Water | balance | was warmed to 43° C., whereupon a cobalt base stator assembly fabricated with Nicrobraze LM (Ni 82-S, Cr 7, Si 4.5, B 3.0, Fe 3.0) was immersed therein. After 19 hours the braze had been completely selectively stripped allowing separation of the two segments.

Several significant improvements have been realized by these novel compositions. The formulations can strip coatings and brazes from a plurality of metal substrates at stripping rates measured in hours, as compared with days for prior art alkaline solutions. Also, the lower operating temperatures of the solutions of the invention permit the usage of low melting point was maskants. The peroxide reaction products decompose after use to harmless reaction products, H$_2$O and O$_2$, as contrasted with many oxidants in current use which often cannot be easily disposed of, and may pose environmental hazards.

In accordance with the invention, a novel method for stripping hard surface coatings and nickel-base brazes from metal, particularly high strength allows, has been devised which comprises contacting the surface coating at a temperature of about 30°-45° C., and preferably about 35° C., with an aqueous solution of the composition described earlier, in an amount sufficient to maintain the acidity, i.e., the pH of the contacting solution at a value between about −1 to 0.5, and continuing the contacting of the surface coating with the solution until the surface coating has been selectively removed from the metal substrate.

During operation, it is preferred that the solution be regularly agitated in order to produce the most efficient stripping conditions. Either workpiece agitation or strong mechanical solution agitation is satisfactory. Spray applications may also be used.

It will be apparent to those skilled in the art that many variations and modifications can be made to the specific embodiments discussed above. All such departures from the foregoing specification are considered to be within the scope of the invention as defined by this specification and the appended claims.

We claim:

1. A method for the selective stripping of tungsten carbide coatings for metal substrates comprising:
   (a) contacting the substrate with an aqueous solution comprising about 75-250 g/l of a peroxide agent, an effective amount of a phosphonic acid and the remainder being water;
   (b) immersing the substrate in the solution at a temperature of about 20°-55° C. until the coating is substantially removed from the substrate; and
   (c) removing the substrate from the solution.

2. The method of claim 1 wherein the phosphonic acid is selected from the group consisting of NTPA, HEDPA and mixtures thereof.

* * * * *